L. HOLMS.
MATCH MACHINERY, &c.
No. 15,238. Patented July 1, 1856.
2 Sheets—Sheet 1.
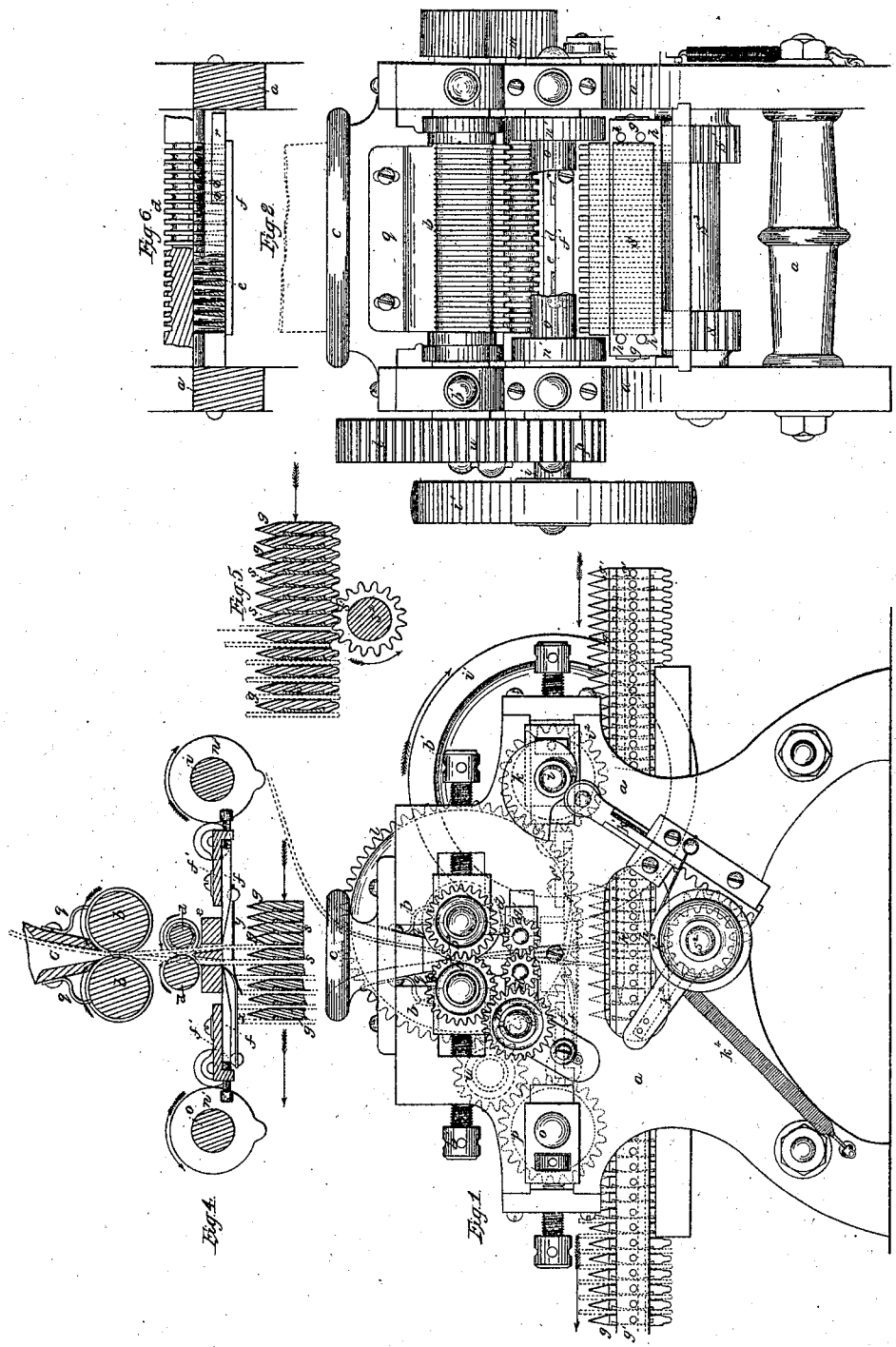

2 Sheets—Sheet 2.
L. HOLMS.
MATCH MACHINERY, &c.
No. 15,238. Patented July 1, 1856.
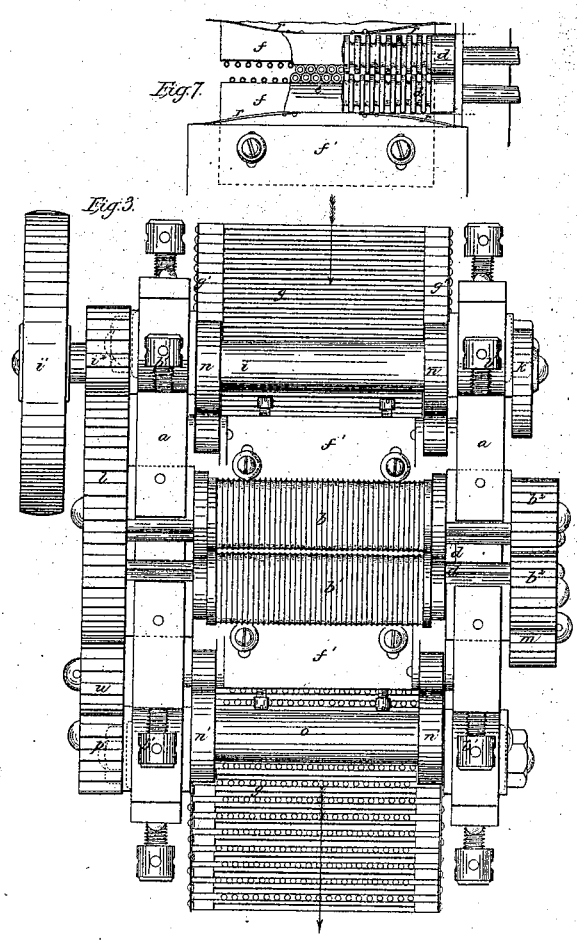

UNITED STATES PATENT OFFICE.

LAURENCE HOLMS, OF PATERSON, NEW JERSEY.

MATCH-MACHINE.

Specification of Letters Patent No. 15,238, dated July 1, 1856.

*To all whom it may concern:*

Be it known that I, LAURENCE HOLMS, of Paterson, in the county of Passaic and State of New Jersey, have invented certain new and useful Combinations of Machinery for the Manufacture of Match-Splints; and I do by the within description fully set forth and ascertain the same, referring to the accompanying drawing, in which—

Figure 1, is a side elevation. Fig. 2, is an end elevation. Fig. 3, is a top plan with the hopper removed. Fig. 4, is a cross section of the parts of the machine used in cutting the splints and separating them; Fig. 5, separate section of a portion of the clamp into which the matches are put; Fig. 6, section of a portion of the separating rolls and dies into which the separated splints pass to be cut to the proper lengths; Fig. 7, plan of the same parts with portions in section.

The same letters are used to designate like parts in all the figures.

My invention consists of certain machinery by which match splints are formed and set in clamps ready for dipping.

It is composed of parts as follows: In a suitable frame $a$ two rollers $b$ are set just below a feeding hopper $c$. The rollers $b$ are grooved around their peripheries, each groove being a semicircle or nearly so and the projections between the groovs being brought up to an edge, as clearly seen in Figs. 2 and 3. The journals of these rollers are set in sliding boxes in the frame which can be set up by screws $b'$, as clearly represented in Fig. 1, in a manner well known to machinists. A thin slip of wood being passed down between these rollers is reeded and nearly severed into round splints, as will be obvious from an inspection of the drawing.

At a suitable distance below the rollers $b$ are similar ones $d$, with this difference, that the grooves are made much deeper and there are but half the number of them, the spaces left between them being as broad on the periphery of the roller as one groove and the grooves are so arranged on these second rollers $d$ as to bring each groove on the one opposite a projection on the other as shown in Fig. 7. Thus as the reeded slip of wood passes down it will be evident that as it comes into contact with the rollers $d$ every other reed will be severed from those adjoining and pass down through the grooves in one roller while the alternate ones will enter the grooves in the opposite roller, and in this manner the reeded slip will be separated into a series of round splints, separated in one direction the breadth of an intermediate splint and in the other any desirable distance, as shown in Fig. 4, where, as in all the other figures the splints are shown by red lines. Below the rollers $d$ a stationary die-plate $e$ is located having holes pierced in it opposite the points where the splints leave the rollers $d$. These holes should be tapered broadest at the top so as to receive the splint with more freedom and certainty and direct it downward in its course. Directly below the die-plate $e$ two knives $f$ set in stocks $f'$ are placed with the bevel downward so as to bring their edges close to the lower surface of the die plate as appears in Fig. 4. These knives vibrate across the holes in the die plate at certain intervals so as to cut off the splints and determine their length. As the splints are projected down below the die-plate $e$ their lower ends enter between the slats $g$ of a spring clamp which slides along below. This securely holds the splints in proper position after they are cut off by the vibrating knives as before named.

The clamp $g$ is an important feature of my invention. In its construction and adaptation by me it is composed of a series of slats or thin pieces of wood beveled to an edge above and formed into a cog at their lower edge. This form is represented most clearly in the cross section Fig. 5, and one slat is shown in front view in Fig. 2. In the section there is a recess $s$ shown on one side of each slat filled with cloth, rubber, or other suitable elastic substance represented by the red color. The proportional magnitude of this is also seen in Fig. 2, and when the slats are together as seen on the right hand side of the cog-wheels $s'$, Fig. 5, they form a rack on their lower side which will gear into said cog-wheel, by which it is driven forward, as will hereafter more fully appear. All the slats are kept compressed by the elastic spring $g'$ of india rubber or other suitable material and as the splints enter between them they are separated a sufficient distance to receive the splints which they hold by their tendency to collapse.

To keep all the slats in line and straight I affix to the two outside or end ones rods, shown by dotted lines at $h$, Fig. 1, the rod attached to the right hand end being in the figures above the left hand one. Below they pass through holes made in the end of the slats at each side as seen at $h$ $h$ Fig. 2, and by passing by each other at the center, as seen in Fig. 1, when the slats are apart or together a distance far enough to maintain their sustaining influence and keep the slats in line the clamp is at all times straight and rigidly accurate for the passage through the machine. When this clamp thus constructed, is filled, it holds each match splint in proper condition to dip and it is then taken and the processes of completing the match by dipping as usual by hand performed when by expanding the clamp a little more they are all discharged into proper receptacles for boxing.

For moving the different parts of this machine I have adopted the following devices although it is obvious modifications and changes may be made to effect the proper movements. To the shaft $i$ the motive power is applied by means of pulley $i'$ or otherwise. A cam $k$ on this shaft slides a rack bar $k'$ downward and the rack bar gearing into a segment affixed to arm $k^2$ turns it. On $k^2$ there is a spring catch that works into a crown ratchet $k^3$, most clearly shown in Fig. 2. The spring $k^4$ draws back the arm and catch and this causes the ratchet wheel to revolve and turn shaft $s^2$ on which are the cog wheels $s'$ that move the clamp at regular and proper intervals to receive the matches. On the shaft $i$ will be formed a pinion $i^2$ which gears into a spur wheel $l$ on the axis of one of the rollers $b$ which it thus turns. The two rollers $b$ are geared together by pinions $b^2$ one of which actuates a stud pinion $m$ that gears into one of the match pinions $d'$ by which rollers $d$ are driven. The size and proportion of the several gear wheels being adapted to the motion required.

On the driving shaft $i$ two cams $n$ are placed to drive forward the right hand knife $f$, as seen in the drawing Fig. 1, by which one set of the matches is cut. On the opposite side of the machine is a shaft $o$ similar to the shaft $i$, having a pinion $p$ on it that is driven by the spur wheel $l$ by means of the intermediate $n$. This has cams $n'$ on it that force forward the left hand knife $f$. Both knives $f$ are made to draw back by means of springs $r$ see Figs. 6 and 7.

To keep the upper grooved or reeding rollers $b$ clean I use a scraper $q$ for each permanently affixed to the frame and casing in contact with said rollers in such a way as to clear off all splinters, gum, et cetera, that might otherwise accumulate thereon and prevent their perfect action. I also place over the left hand knife below a shield $x$ against which the ends of the splinter press as they move forward without coming in contact with the knife. This shield $x$ yields as the knife operates and is kept up against it by the spring $y$.

Having thus fully described my improved match splint machine what I claim therein as new and desire to secure by Letters Patent is:

1. The combination of the reeding rollers $b$ and separating rollers $d$ as herein described.

2. In combination with the above the die-plate $e$ and knives $f$ for completing the splint constructed and operated substantially as set forth.

3. I claim the shield $x$ employed in the manner and for the purposes above described.

LAURENCE HOLMS.

Witnesses:
JOSEPH HOLLELY,
M. I. WILLIAMS.